(12) United States Patent
Miomo

(10) Patent No.: US 7,746,489 B2
(45) Date of Patent: Jun. 29, 2010

(54) IMAGE FORMING APPARATUS

(75) Inventor: Takahiro Miomo, Higashiosaka (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 1498 days.

(21) Appl. No.: 10/968,966

(22) Filed: Oct. 21, 2004

(65) Prior Publication Data

US 2005/0088682 A1 Apr. 28, 2005

(30) Foreign Application Priority Data

Oct. 24, 2003 (JP) .............................. 2003-364017

(51) Int. Cl.
*G06K 15/00* (2006.01)
*H04N 1/387* (2006.01)

(52) U.S. Cl. ...................... 358/1.14; 358/1.18; 358/450

(58) Field of Classification Search ....................... None
See application file for complete search history.

(56) References Cited

U.S. PATENT DOCUMENTS

| | | | | |
|---|---|---|---|---|
| 6,804,015 | B1 * | 10/2004 | Lee ............................. | 358/1.1 |
| 6,806,974 | B1 * | 10/2004 | Ueda et al. .................. | 358/1.13 |
| 6,950,213 | B1 * | 9/2005 | Gurevich .................... | 358/401 |
| 2002/0030842 | A1 * | 3/2002 | Iida ........................... | 358/1.14 |
| 2004/0190039 | A1 * | 9/2004 | Lay et al. ................... | 358/1.14 |

FOREIGN PATENT DOCUMENTS

| | | |
|---|---|---|
| JP | 64-51778 | 2/1989 |
| JP | 64-051778 | 2/1989 |
| JP | 5-270080 | 10/1993 |
| JP | 2003-229981 | 8/2003 |

OTHER PUBLICATIONS

Office Action dated Jan. 6, 2009 and its partial translation.

* cited by examiner

*Primary Examiner*—David K Moore
*Assistant Examiner*—Marcus T Riley
(74) *Attorney, Agent, or Firm*—Kratz, Quintos & Hanson, LLP

(57) ABSTRACT

An image forming apparatus according to the present invention performs a process of printing on the printing paper in such a manner that, if a plurality of images are to be printed on one sheet of printing paper and there is improper image data among the image data of the plurality of images, a region in which an image corresponding to the improper image data is to be printed is left blank, and if the image data of all of the plurality of images is improper, the image forming apparatus does not perform the process of printing on the printing paper.

Another image forming apparatus according to the present invention reads out image data of a plurality of images from a recording medium, prepares printing image data for an image in which the plurality of images, having been reduced, are arranged in predetermined regions, and prints that image on one sheet of printing paper. If the image data of the plurality of images comprises improper image data, then the image forming apparatus prepares the printing image data in such a manner that regions in which images corresponding to the improper image data are arranged are left blank, and the image forming apparatus does not perform the process of printing on the printing paper if the image data of all of the plurality of images is improper.

18 Claims, 8 Drawing Sheets

FIG. 6

| Image Number | Filename |
|---|---|
| 0 | SANY0001.jpg |
| 1 | SANY0002.jpg |
| 2 | SANY0003.jpg |
| N−2 | SANY0098.jpg |
| N−1 | SANY0099.jpg |

IMAGE FORMING APPARATUS

TECHNICAL FIELD

The present invention relates to an image forming apparatus that prints, on one sheet of printing paper, a plurality of images that are recorded on a recording medium.

BACKGROUND ART

An image forming apparatus that prints (forms) an image taken by an image-taking apparatus, such as a digital still camera, on printing paper usually has a function that performs index printing. In index printing, all images recorded on a recording medium or all images stored in a specified folder are reduced and printed on one or more sheets of printing paper by a predetermined number or batch (for example 20 images per printing paper). A user can take a glance over the images recorded on the recording medium or stored in the folder by executing this process of printing on the printing papers. Furthermore, with a conventional image forming apparatus, the user can print a plurality of images that the user freely selects on one or more sheets of printing paper by a predetermined number or batch (hereafter referred to as "multiple image printing"). In multiple image printing, 2, 4, 9, or 16 images are reduced and printed on one sheet of printing paper, for example.

Thus, in index printing and multiple image printing, a plurality of images are printed on one sheet of printing paper, but if the image data of one image is corrupted, then the image cannot be printed on the sheet of printing paper. In this case, various measures are conceivable such as eliminating blanks between the images, but in some image forming apparatuses, index printing or multiple image printing is performed by leaving those regions blank in which images corresponding to corrupted image data are to be arranged (see JP 64-51778A, for example). The empty portions on the printing paper after the printing let the user know that corrupted image data is included in the series of image data that is subjected to index printing or multiple image printing, or in other words, that the process of printing is not performed properly.

However, if the above-described process is performed in index printing or multiple image printing and all image data of the plurality of images to be printed on one sheet of printing paper is corrupted (if all 20 sets of image data associated with 20 images to be printed on one sheet of printing paper are corrupted in index printing, for example), then a printing paper on which no reduced images is printed is output from the image forming apparatus and the printing paper is wasted. Such a situation arises when even though all or some of the image data recorded on the recording medium is subjected to image processing, the image data after the image processing is corrupted by malfunctioning of the image processing, for example.

In view of the above-described problems, it is an object of the present invention to provide an image forming apparatus that does not output a printing paper on which not a single image is printed, if a plurality of images is to be printed on a printing paper, as in index printing or multiple image printing or the like.

DISCLOSURE OF THE INVENTION

An image forming apparatus according to the present invention performs a process of printing on the printing paper in such a manner that, if a plurality of images are to be printed on one sheet of printing paper and there is improper image data among the image data of the plurality of images, a region in which an image corresponding to the improper image data is to be printed is left blank, and if the image data of all of the plurality of images is improper, the image forming apparatus does not perform the process of printing on the printing paper.

Another image forming apparatus according to the present invention reads out image data of a plurality of images from a recording medium, prepares printing image data for an image in which the plurality of images, having been reduced, are respectively arranged in predetermined regions, and prints that image on one sheet of printing paper, wherein, if the image data of the plurality of images comprises improper image data, then the image forming apparatus prepares the printing image data in such a manner that regions in which images corresponding to the improper image data are arranged are left blank, and the image forming apparatus does not perform the process of printing on the printing paper if the image data of all of the plurality of images is improper.

A method of printing a plurality of images on one sheet of printing paper using an image forming apparatus comprises a step of determining whether or not image data of the plurality of images comprises improper image data, and a step of performing a process of printing on the printing paper in such a manner that regions in which images corresponding to the improper image data should have been printed are left blank, wherein the process of printing on the printing paper is not performed if the image data of all of the plurality of images is improper.

When printing a plurality of images on one sheet of printing paper, the image forming apparatus of the present invention does not perform the process of printing on the printing paper if the image data of all the images is improper, in other words, if none of the images can be reduced and printed on the printing paper, or every single one of the images is improper for printing. Thus, in index printing, the image forming apparatus of the present invention does not output printing paper on which not a single image is printed and waste of printing paper can be avoided.

BRIEF EXPLANATION OF THE DRAWINGS

FIG. 6 is a diagram showing a list that the printer of the embodiment of the present invention prepares.

BEST MODE FOR CARRYING OUT THE INVENTION

An image forming apparatus of the present invention is explained with reference to the drawings. Below, embodiments are explained in which the present invention is applied to a printer, but the present invention is widely applicable to image forming apparatuses (copiers and facsimile apparatuses, for example) that have a function for printing a plurality of images on one sheet of printing paper.

Figure 1:
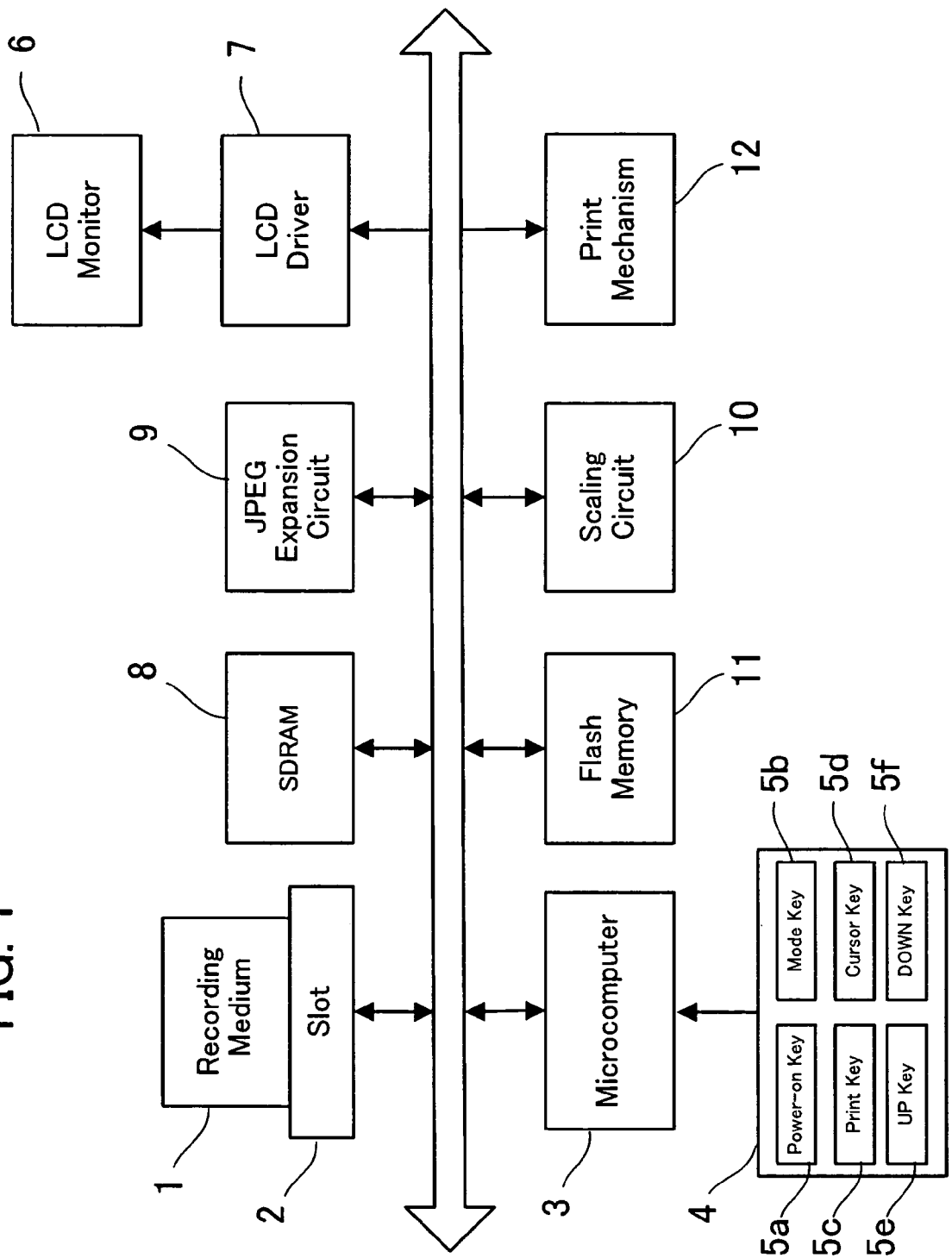
FIG. 1 is a block diagram showing the configuration of a printer of an embodiment of the present invention.

FIG. 1 is a block diagram showing an outline of the printer of an embodiment according to the present invention. The printer has a slot (2) in which a recording medium (1) can be freely inserted and removed. Image data of images that are taken by an image-taking apparatus such as a digital still camera or the like is recorded on the recording medium (1). The printer processes the image data recorded on the recording medium (1), and outputs the images by printing them on the printing paper. In the present embodiment, the image data is recorded on the recording medium (1) in JPEG format. The recording medium (1) is provided with a small IC chip such as a CompactFlash (registered trademark), a SmartMedia (registered trademark), an SD Memory Card (registered trademark) or the like.

A microcomputer (3) performs various processes and controls of the printer. The microcomputer (3) has a CPU that performs arithmetic processing, a ROM that records various process and control programs, and a RAM that temporarily stores various data and the programs that are performed by the CPU (none is shown in the drawing).

An operation panel (4) equipped with various operation keys is connected to the microcomputer (3). The operation panel (4) includes a power-on key (5a), a mode key (5b), a print key (5c), a cursor key (5d), an UP key (5e) and a DOWN key (5f). The power-on key (5a) is used to turn on or turn off a power supply of the printer. The mode key (5b) is used to select various operation modes of the printer. The print key (5c) is used to indicate the start of a printing operation. The cursor key (5d) is used to move a cursor displayed on an LCD monitor (6) vertically and horizontally when selecting an image to print, for example. The UP key (5e) and the DOWN key (5f) are used to set various parameters such as a number of printing papers to print. Various setting screens for selecting the operation mode of the printer and the images to be printed, for example, are displayed on the LCD monitor (6), which serves as a display portion. An LCD driver (7) drives the LCD monitor (6) based on the commands from the microcomputer (3).

The image data of the images that are printed is read from the recording medium (1) by the microcomputer (3) as needed and stored in an SDRAM (8). The image data is compressed in JPEG format and a JPEG expansion circuit (9) expands the image data that is read from the SDRAM (8). The scaling circuit (10), which is made of an ASIC, subjects the image data that has been expanded to a scaling process, that is, a magnification (interpolation) or a reduction (thinning) process.

The SDRAM (8) has a first storage region that is used for storing the image data that is read from the recording medium (1) and a second storage region that stores the image data for the printing process, that is, the image data of the images that are actually or ultimately printed on the printing paper (hereafter referred to as "printing image data"). The printer of the present embodiment has a function for index printing as well as for multiple image printing. If the printer performs either index printing or multiple image printing, the image data is successively read from the recording medium (1), and is appended to the printing image data stored in the second storage region after subjecting the image data to the expansion process and the reduction process.

Figure 2A:
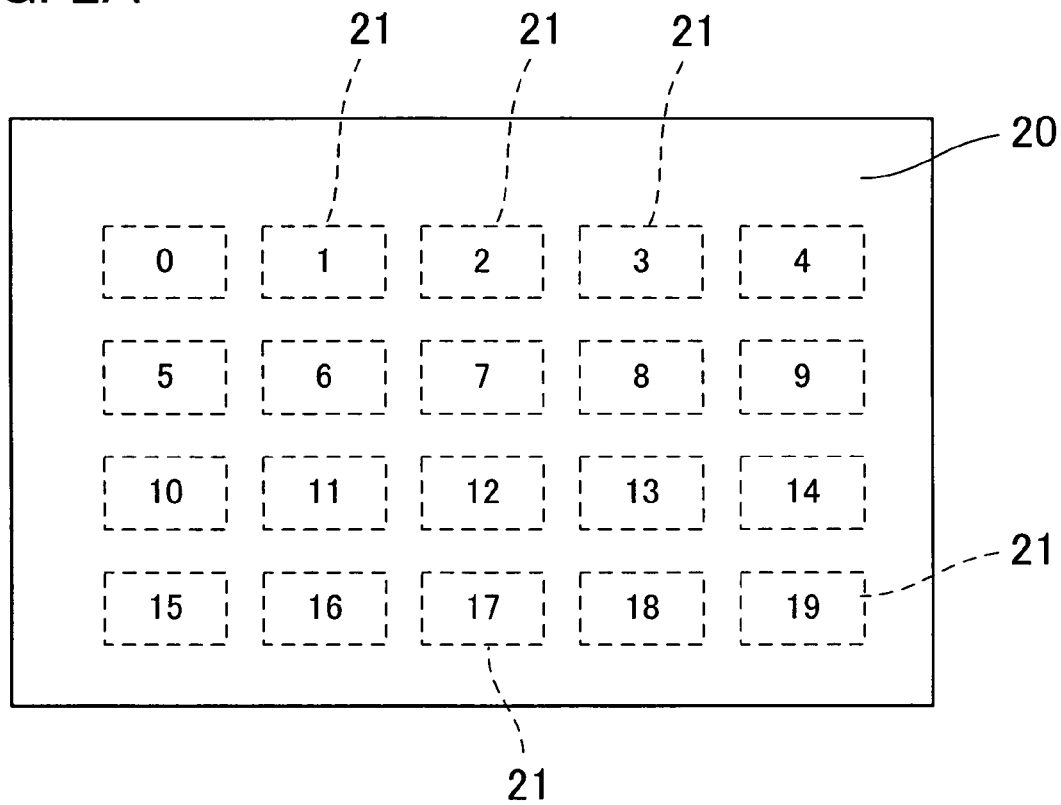
FIG. 2A is a diagram showing an arrangement of reduced images on a printing paper in index printing performed by the printer of the embodiment of the present invention.
Figure 2B:
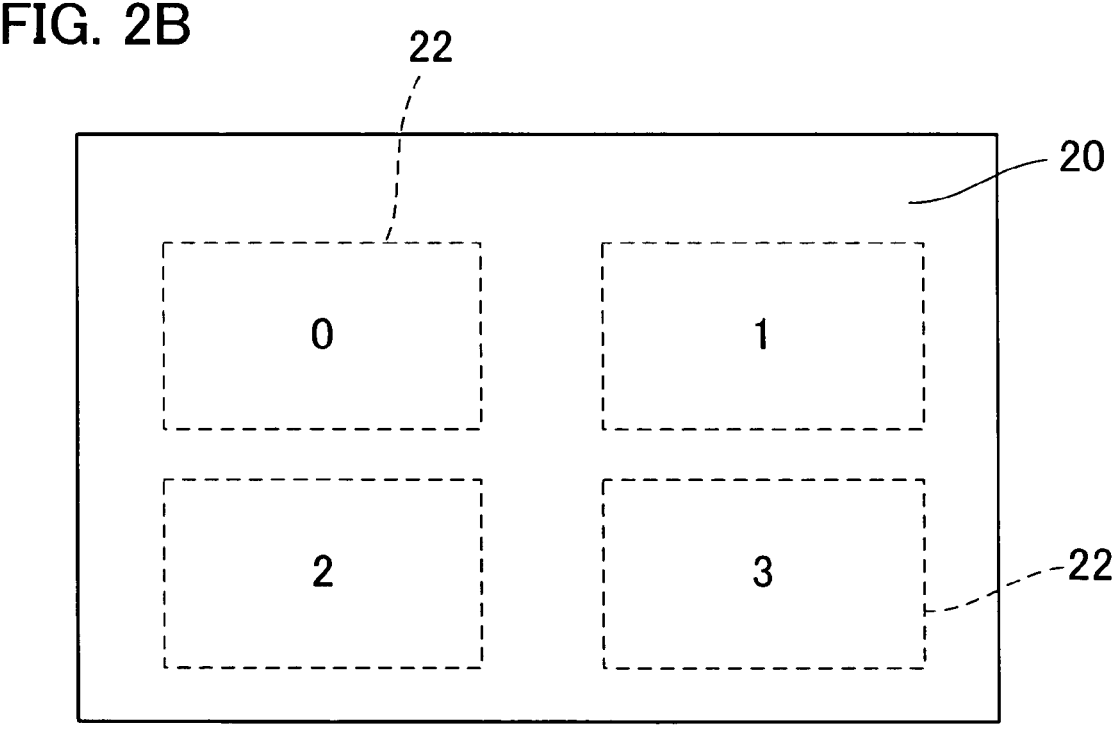
FIG. 2B is a diagram showing an arrangement of the reduced images on the printing paper in multiple image printing performed by the printer of the embodiment of the present invention.

FIG. 2A is a diagram showing an arrangement of reduced images on the printing paper (20) in index printing and FIG. 2B is a diagram showing an arrangement of the reduced images on the printing paper (20) in multiple image printing. In the printer of the present embodiment, regions (21) and (22) on which the reduced images are arranged in index printing or multiple image printing are configured in a matrix. Furthermore, each of the regions (21) and (22) is specified by a number beginning from zero. In the present embodiment, 20 reduced images are printed on one sheet of printing paper in index printing and, as shown in FIG. 2A, the regions (21) on which the reduced images are arranged are given a number in order from the leftmost region in the top row. For example, number 0 is given to the leftmost region (21) in the top row, number 1 is given to the region (21) right of the region 21 numbered 0, and number 19 is given to the rightmost region (21) in the fourth row.

In multiple image printing, a plurality of the reduced images that are selected by a user are printed on one or more sheets of printing paper by a predetermined number of images. In the present embodiment, the user can select the number of images to be printed on one sheet of printing paper in multiple image printing from the values 2, 4, 9, or 16 using the operation panel (4). FIG. 2B shows the case of multiple image printing in which 4 reduced images are printed on one sheet of printing paper (20). As is the case in index printing, the regions (22) of multiple image printing on which the reduced images are arranged are specified by a number given in order from the leftmost region in the top row.

The printing image data that is stored in the second storage region of the SDRAM (8) is the image data that spans all regions of the sheet of printing paper (20) and the image data is appended to the printing image data by successively storing the image data that has been reduced by the scaling circuit (10) in address ranges of the SDRAM (8) that respectively correspond to the regions (21) and (22) on which the reduced images are arranged on the sheet of printing paper. For example, in the case of index printing, the image data that has been reduced by the scaling circuit (10) is successively stored in the address ranges that respectively correspond to the 20 regions (21) shown in FIG. 2A. The same also applies to the case of multiple image printing. After the image data has been appended, pixel data displayed as white is stored in the portions of the second storage region in which no image data of the reduced images is stored. It should be noted that it is also possible to store pixel data displayed as white in all regions of the second storage region of the SDRAM (8) in advance as the printing image data.

Font data of characters, numbers and the like that are used to print additional information such as a shooting date, a page number of the printing paper or the like on the printing paper along with the image are stored in a flash memory (11), which is a rewritable non-volatile storage medium. For example, if the additional information or the like is printed in the index printing mode or the multiple image printing mode, the microcomputer (3) stores the font data denoting the additional information or the like in the appropriate address range of the second storage region after a series of image data that is output from the scaling circuit (10) is stored in the second storage region of the SDRAM (8). It should be noted that a program that describes the operation of the printer in index printing, which is described below, usage history information of the printer and the like is stored in the flash memory (11) in addition to the font data.

A print mechanism (12) is made of a cassette that accommodates the printing paper, a carrier device for the printing paper, a thermal head, a thermal head driver, a device for the moving thermal head, a thermal transfer ribbon, a carrier device for the thermal transfer ribbon and the like (none of which is shown in the drawing). A post card may be used as the printing paper, for example. If the print key (5c) of the operation panel (4) is pressed, then the microcomputer (3) sends the printing image data that is stored in the SDRAM (8) to the print mechanism (12). The print mechanism (12) outputs the printed image on the printing paper based on the sent printing image data.

In index printing or multiple image printing, the microcomputer (3) appends the image data to the printing image data as described above, that is, the microcomputer (3) performs a process of successively storing the image data after the scaling process in the address ranges of the SDRAM (8) that correspond to the respective regions (21) or (22) on the printing paper (20) in which the reduced images are arranged. The appending of the image data to the printing image data is performed in order of the number of the placement position. If the image data that is read from the recording medium (1) is corrupted, then the scaling process of the image data fails and the image data (to be stored in the second storage region of the SDRAM (8)) that is appended to the printing image data is not output from the scaling circuit (10). The scaling circuit (10) informs the microcomputer (3) whether or not the scaling process of the image data fails and if the microcomputer (3) is informed by the scaling circuit (10) that the scaling process has failed, the microcomputer (3) appends the image data to the printing image data such that the region in which the corrupted image data was supposed to be recorded is left blank (the image data that is output in the next step from the scaling circuit (10) is not stored in the address range of the SDRAM (8) in which the corrupted image data was supposed to be recorded).

Figure 3:
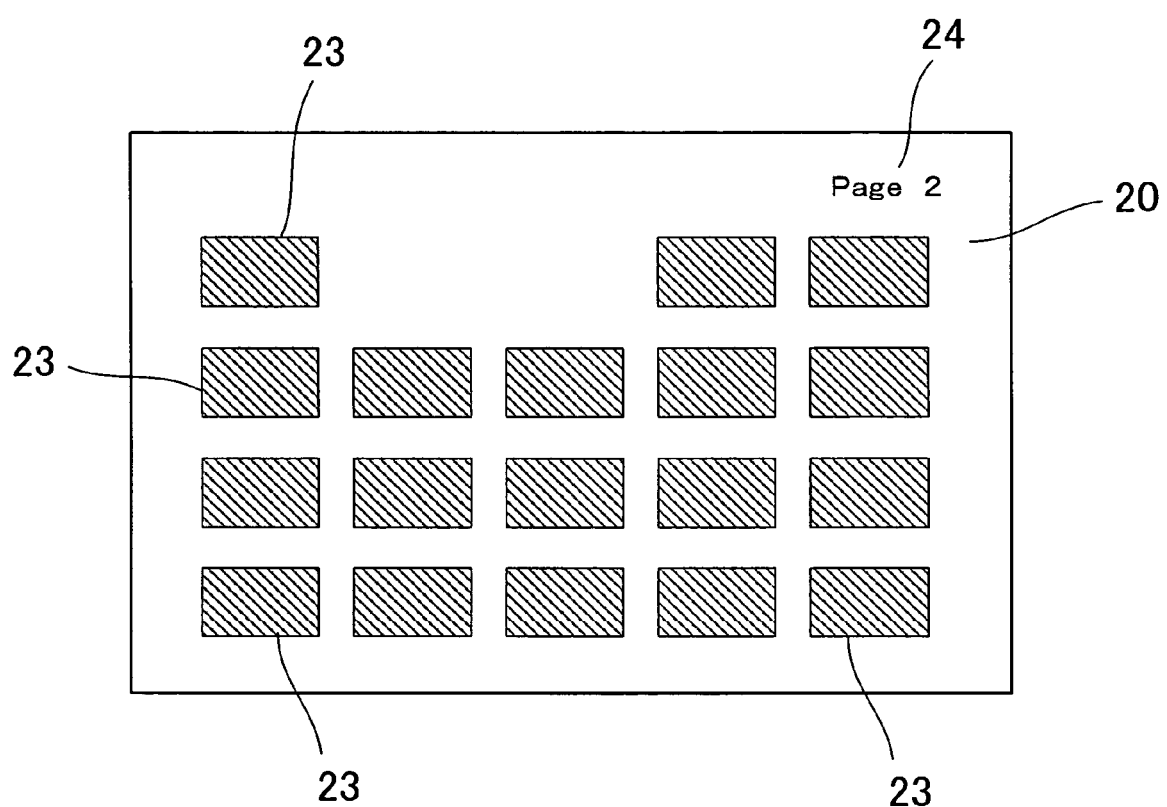
FIG. 3 is a diagram showing the state of printing paper on which reduced images are index printed by the printer of the embodiment of the present invention.

FIG. 3 shows an example of a printing paper (20) on which the reduced images are index printed. FIG. 3 shows the case that the image data of the reduced images that are to be arranged in the region (21) of number 1 and the region (21) of number 2 shown in FIG. 2A are corrupted. Since the scaling process of the image data with the scaling circuit (10) fails, these regions (21) and (21) are left blank on the printing paper (20) after the process of index printing has been performed. Reduced images (23) are printed in the regions (21) of the other numbers. It should be noted that a character string (24) showing the page number of the printing paper (20) in index printing is printed in the top right hand corner of the printing paper (20). By looking at the character string (24) and the white portions left blank, the user can easily specify the images that have not been printed.

Figure 4:
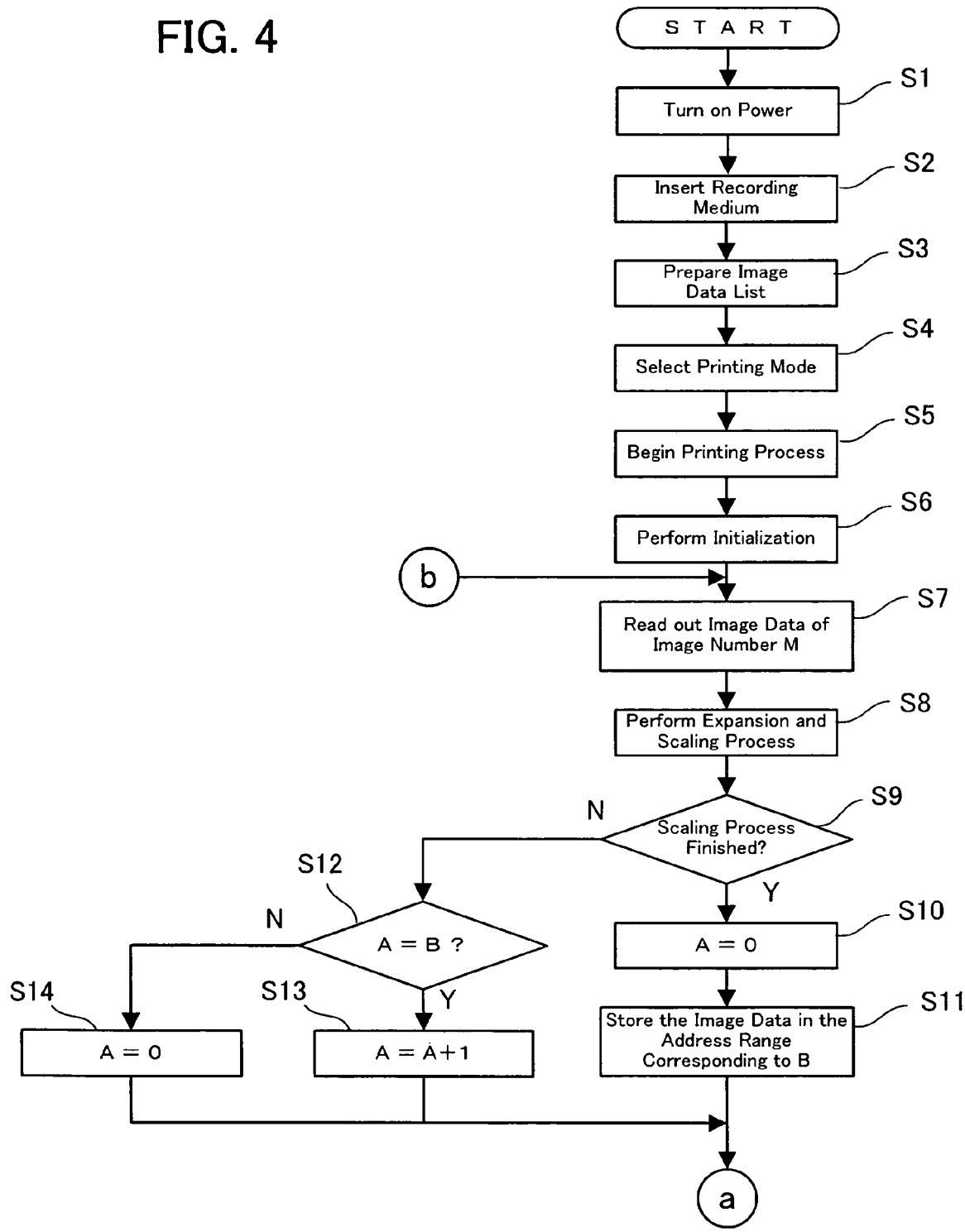
FIG. 4 is a flowchart showing the operation that the printer of the embodiment of the present invention performs in index printing.
Figure 5:
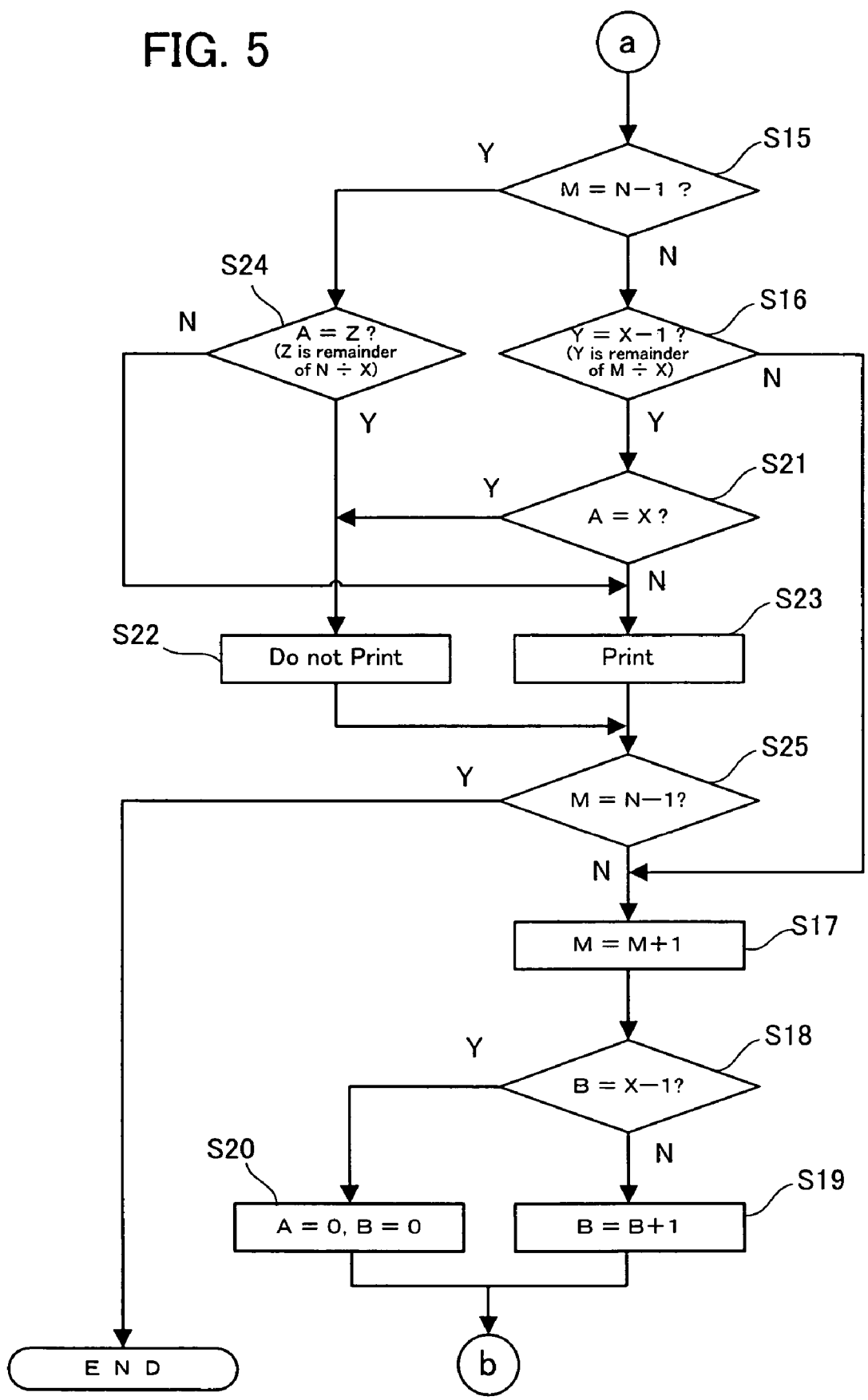
FIG. 5 is a flowchart showing the operation that the printer of the embodiment of the present invention performs in index printing.

The following is an explanation of the operation that the printer of the present embodiment performs in index printing. FIGS. 4 and 5 are flowcharts that explain the operation. First, the power-on key (5a) of the operation panel (4) is pressed, and the power of the printer is turned on (S1). Next, the recording medium (1) is inserted into the slot (2) by the user (S2). Then, the microcomputer (3) makes a list of the image data recorded on the recording medium (1) and stores the list and the total number N of the images in the internal RAM (S3).

FIG. 6 shows an example of the list of the image data that has been put together. The data of the N images from file "SANY0001.jpg" to file "SANY0099.jpg" is recorded on the recording medium (1). The list is made of these filenames and image numbers that uniquely correspond to the image data. As image numbers, integers starting from 0 are assigned continuously to the image data. In the list shown in FIG. 6, the image numbers from 0 to N−1 are respectively assigned to these image data.

Next, the mode key (5b) of the operation panel (4) is operated by the user to select index printing (S4). When the print key (5c) is operated, then the process of index printing begins (S5). In the explanation hereafter, the number of the reduced images that are printed on one sheet of printing paper, that is, the maximum number of the image data sets that can be appended to the printing image data is represented by X. In the case of index printing, the value of X is set to 20. It should be noted that the same operation as the operation shown in FIGS. 4 and 5 is also performed in multiple image printing. In this case, in addition to selecting multiple image printing at step S4, the value of X is set by using the UP key (5e) and/or the DOWN key (5f). The value of X is selected from 2, 4, 9, or 16.

When the process of index printing begins, the variables used in the process that are stored in the RAM of the microcomputer (3) are first initialized (S6). The variables used in the process are a variable A that denotes the number of times that the scaling process of the image data in the scaling circuit (10) has failed; a variable B that denotes the region in which the image data is arranged after the scaling process; and a variable M that denotes the image data that is subjected to the scaling process (as well as the appending process). These variables are all set to 0 in step S6. Variable B corresponds to the number that specifies the region in which the reduced image is arranged shown in FIG. 2A and takes a value from 0 to 19. Variable M corresponds to the image number shown in FIG. 6 and takes a value from 0 to N−1.

After step S6, the microcomputer (3) reads the image data with the image number M out of the image data stored on the recording medium (1) (S7). After the image data that has been read out is stored in the first storage region of the SDRAM (8), the image data is sent to the JPEG expansion circuit (9) for the expansion process and further sent to the scaling circuit (10) for the scaling process (S8). After step S8, the microcomputer (3) determines whether or not the scaling process of the image data was successful by being informed from the scaling circuit (10) (S9).

If the scaling process of the image data of image number M by the scaling circuit (10) can be performed (or succeeds) (that is, if the image data of image number M that is read from the recording medium (1) is not corrupted), then the microcomputer (3) sets the value of variable A to zero (S10), and stores the image data after the scaling process in the address range of the SDRAM (8) that corresponds to the region in which the reduced image is arranged, as denoted by the value of variable B (S11). Thus, the image data of image number M is appended to the printing image data, so that the reduced image is printed at the placement region denoted by variable B. For example, if the value of variable B is 0, then the image data is stored in the address range of the second storage region that corresponds to the leftmost region (21) in the top row shown in FIG. 2A. If the value of variable B is 1, then the image data is stored in the address range that corresponds to the region (21) to the right thereof, and if the value of variable B is 19, then the image data is stored in the address range that corresponds to the rightmost region (21) in the 4th row.

If the scaling process of the image data cannot be performed by the scaling circuit (10) (or fails) (that is, if the image data that has been read is corrupted), then the microcomputer (3) determines whether or not the value of variable A is equal to the value of variable B (S12). If the value of the variable A is equal to the value of the variable B, then the value of the variable A is incremented (S13). If the value of the variable A is not equal to the value of the variable B, then the value of the variable A is set to zero (S14).

Next, see FIG. 5. After step S11, S13, or S14, the microcomputer (3) determines whether or not the image data of image number M is the last image data subjected to the scaling process (and the appending process), that is, whether or not the image data is the last image data in the list made in step S3 (S15). More specifically, the microcomputer (3) determines whether or not the value of variable M is equal to N−1. If the value of the variable M is not equal to N−1, that is, if there is more image data that has not yet been processed, then the microcomputer (3) determines whether or not the image according to the image data of image number M is arranged at (or corresponds to) the last placement region (the region (21) labeled 19 shown in FIG. 2A) on the printing paper (20), more specifically, whether or not Y, which is a remainder of the ratio of the value of M divided by X, is equal to X−1 (S16).

If Y is not equal to X−1 in step 16, then the microcomputer (3) increments the value of M (S17). After that, the microcomputer (3) determines whether or not the image data of image number M is the image data of the image that is arranged at (or corresponds to) the last placement region (21) on the printing paper (20), more specifically, if the value of B is equal to X−1 (S18). If the value of B is not equal to X−1, then the microcomputer (3) increments the value of B (S19). If the value of B is equal to X−1, then the value of B is initialized, that is, set to zero in order to let B correspond to the first placement region on the next printing paper; the value of A is also set to zero in order to count the number of failures of the scaling process in the process for the next printing paper (S20). After step S19 or S20, the steps from step S7 are performed again.

By repeating the steps from step S7 to step S19, the image data is successively read in from the recording medium (1) and the image data on which the expansion process and the scaling process has been performed is appended to the printing image data, so that the reduced images are printed on X placement regions on the printing paper. As should be clear from the above explanation, the image data is read in order of the image number shown in the list made in step S3, and the appending of the image data is performed in the order of the number attached to the placement region. Also, after the image data is stored in the address range of the SDRAM (8) that corresponds to the last placement region, step S18 and step S20 are performed and the appending of the image data for printing the reduced images on the next printing paper is performed.

Also, according to the processes in the above explanation, if the scaling process of the image data of image number M fails, then the image data of image number M+1 that is processed next is not stored in the address range of the SDRAM (8) in which the image data of image number M is supposed to be stored, but the placement region of the printing paper in which the reduced image according to the image data of image number M is supposed to be stored is left blank.

In the process of printing the reduced images on one sheet of printing paper, in other words, in a series of scaling processes for printing the reduced images on the printing paper, or, more specifically, in X or Z (where Z is a remainder of the ratio of N divided by X) scaling processes, if the scaling process in the flowcharts shown in FIGS. 4 and 5 is successful at least once and the appending of the image data is performed, then the value of variable A in step S10 becomes zero. When printing the reduced images on one sheet of printing paper, if the scaling process of one set of image data fails, then it is determined in step S12 whether or not the value of the variable A, which denotes the number of times that the scaling processes that have been performed until then have failed, is equal to the value of the variable B, which denotes the number that specifies the placement region of the reduced image. If the scaling process of one set of image data fails, and if all of the scaling processes performed until then fail (for printing the reduced images on one sheet of printing paper), then the values of variable A and variable B are equal, and the value of the variable A is incremented to count the number of failures of the scaling process in step S13. In other words, after X or Z scaling processes have been performed when printing the reduced images on one sheet of printing paper, if the scaling process succeeds at least once out of the X or Z times, then the value of the variable A becomes zero. If all of the scaling processes fail and the appending of the image data never takes place, then the value of the variable A becomes X or Z. It should be noted that if the values of the variable A and the variable B are not equal in step S12, then the value of the variable A is zero; thus it is also possible to omit step S14.

In step S16, if the image according to the image data for which the scaling process has been performed is determined to be arranged at (or corresponds to) the last placement region (21), then the microcomputer (3) determines whether or not the value of A is equal to X (S21). If the value of the variable A is equal to X, then no image data has been appended to the printing image data. In this case, if the print mechanism (12) were made to perform the process of printing the image according to the printing image data on the printing paper, a blank printing paper would be output (or only additional information or the like would be printed); thus the process of printing the image on the printing paper is not performed (S22).

In step S21, if the value of A is not equal to X, then data of at least one image has been appended to the printing image data. In this case, the microcomputer (3) converts the portions other than the image data in the printing image data into image data of white color and further appends the font data of character strings which denote additional information or the like to the printing image data, as necessary. The microcomputer (3) then reads the printing image data from the SDRAM (8) and sends it to the print mechanism (12). After that, the microcomputer (3) initializes the second storage region of the SDRAM (8). The print mechanism (12) prints the image according to the sent printing image data on the printing paper (S23), and the printing paper on which at least one reduced image is printed is output from the print mechanism (12).

In step S15, if the image data on which the scaling process has been performed is determined to be the last image data, then the microcomputer (3) determines whether or not the value of A is equal to Z (S24). Step S24 is a process for the last page of the printing paper. Z reduced images are printed on the last page of printing paper (or, if the total number of the images to be index printed is X or less, then on one sheet of printing paper). However, if the value of A is equal to Z, then no image data is appended to the printing image data. In this case, it is not necessary for the print mechanism (12) to print the image according to the printing image data on the printing paper and the printing is not performed (S22). If the value of A is not equal to Z in step S24, then at least one set of image data is appended to the printing image data. In this case, the image according to the printing image data is printed on the printing paper by the print mechanism (12) (S23).

After step S22 or S23, the microcomputer (3) determines whether or not the image data on which the scaling process has been performed is the last image data, or more specifically, whether or not the value of M is equal to N−1 (S25). If the value of M is equal to N−1, then the index printing process is finished. If the value of M is not equal to N−1, then the steps from step S17 onward are performed.

The foregoing is an explanation of the operation of the printer of present embodiment in index printing, but the operation in multiple image printing can be understood to be similar to the described. In this case, for example, the images to be printed in multiple image printing are selected in step S4 and a list similar to the list shown in FIG. 6 of the image data of the selected images is prepared. Also, in the above-described embodiment, index printing is performed for all image data recorded on the recording medium (1), but index printing can also be performed on the images stored in a selected folder. In this case, for example, the folder is selected in step S4 and a list similar to the list shown in FIG. 6 of the series of the image data stored in the selected folder is prepared.

In the printer of the present embodiment, the recording medium (1) can be freely inserted and removed, but in the image forming apparatus of the present invention, the recording medium on which the image data is recorded may also be a hard disk or other recording medium that is incorporated inside the image forming apparatus; furthermore, the recording medium may also be arranged outside the image forming apparatus. For example, the recording medium that records the images to be printed in index printing or multiple image printing may be incorporated inside an image-taking apparatus such as a digital still camera and access to the recording medium by the image forming apparatus may be made possible by connecting the image-taking apparatus and the image forming apparatus with a data transmission means such as USB.

In the above-described embodiment, whether or not the image data of the image that is subjected to index printing is corrupted is determined by whether or not the scaling process in the scaling circuit (10) succeeds, but other methods can be used to determine whether or not the image data is corrupted. If the recording medium (1) records the image data as well as a header which denotes information about data structure (if the image data is recorded in EXIF (Exchangeable Image File Format) format or the like, for example), then it is possible to determine whether or not the image data is corrupted by reading the header information from the header.

Figure 7:
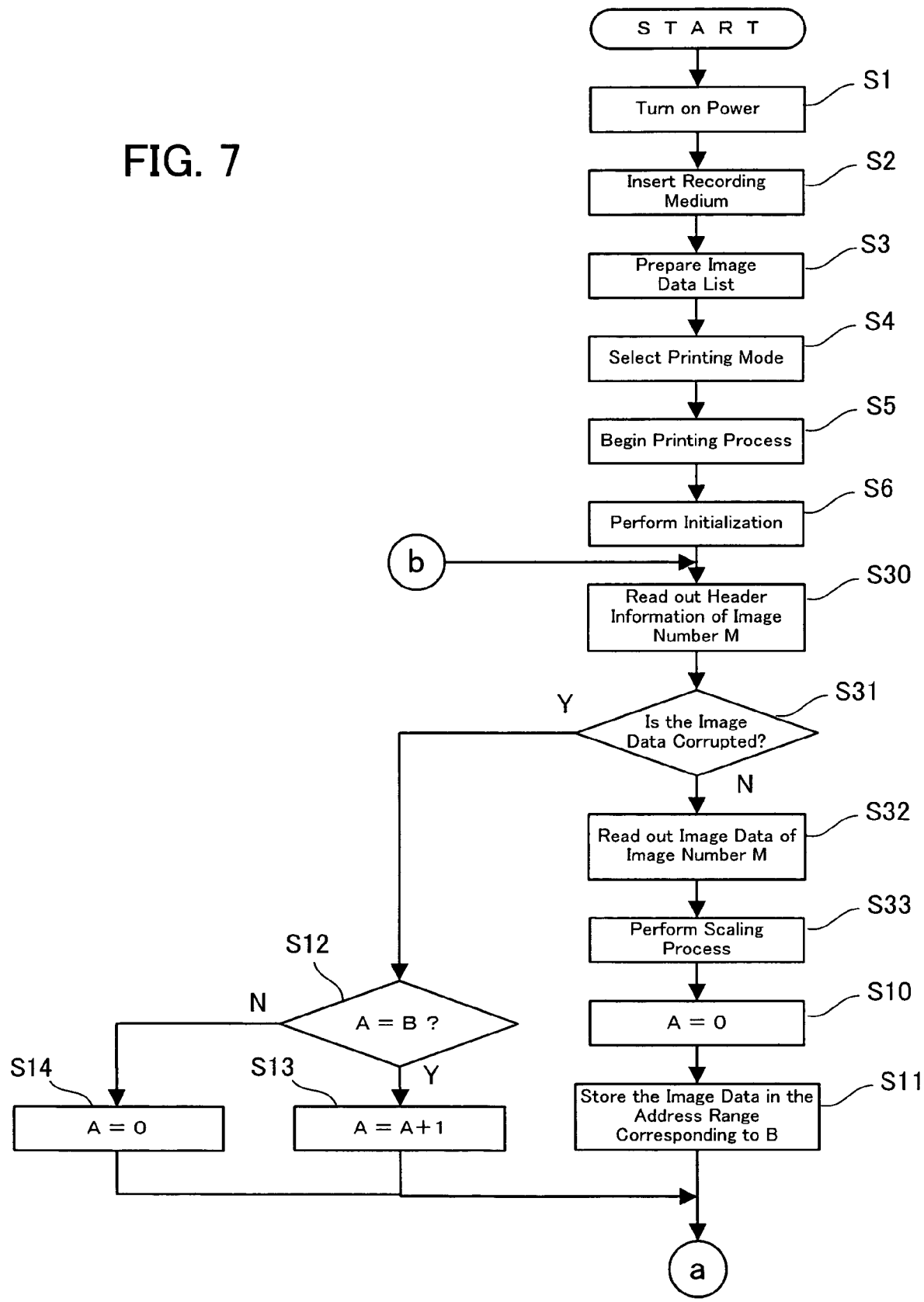
FIG. 7 is a flowchart showing the operation that the printer of a second embodiment of the present invention performs in index printing.

FIG. 7 shows a flowchart that explains the operation that the printer of a second embodiment of the present invention performs in index printing. FIG. 7 corresponds to the flowchart shown in FIG. 4 and processes labeled with the same numerals are the same as described above, so that their further explanations have been omitted (it should be noted that the variable A denotes the number of images whose image data is deemed to be corrupted). After step S6, the necessary or all header information is read from the headers attached to the image data of image number M (S30). Next, the microcomputer (3) determines whether or not the image data of image number M is corrupted based on the header information that has been read in (S31). For example, the header information may include the number of pixels horizontally by vertically in the image data, and the microcomputer (3) may determine whether or not the image data is corrupted by determining whether or not the image data recorded in the recording medium (1) matches the structure indicated by the header information. If the image data of image number M is not corrupted, then the microcomputer (3) reads in the image data and stores it in the SDRAM (8) (S32). Then the scaling circuit (10) performs the scaling process on the image data that has been read in (S33) (if the image data is compressed, then an expansion process or the like is also performed) and the steps from S10 onward are performed. If, in step S31, the image data of image number M is deemed to be corrupted, then the steps from S12 onwards are performed.

In the first and second embodiments, if the image data is corrupted, then the placement region in which the image of this image data is arranged is left blank in index printing. However, there are cases in which it is inappropriate to print or it is impossible to reduce the image and print it on the printing paper because the image data does not satisfy the specification of the printer or the image data does not comply with the standard for image recording used by the printer, for example, and not just because the image data is corrupted. Thus, a printer of a third embodiment of the present invention performs index printing by leaving the placement region in which the image of this image data is arranged blank, if the image data is improper for processing by the printer.

Figure 8:
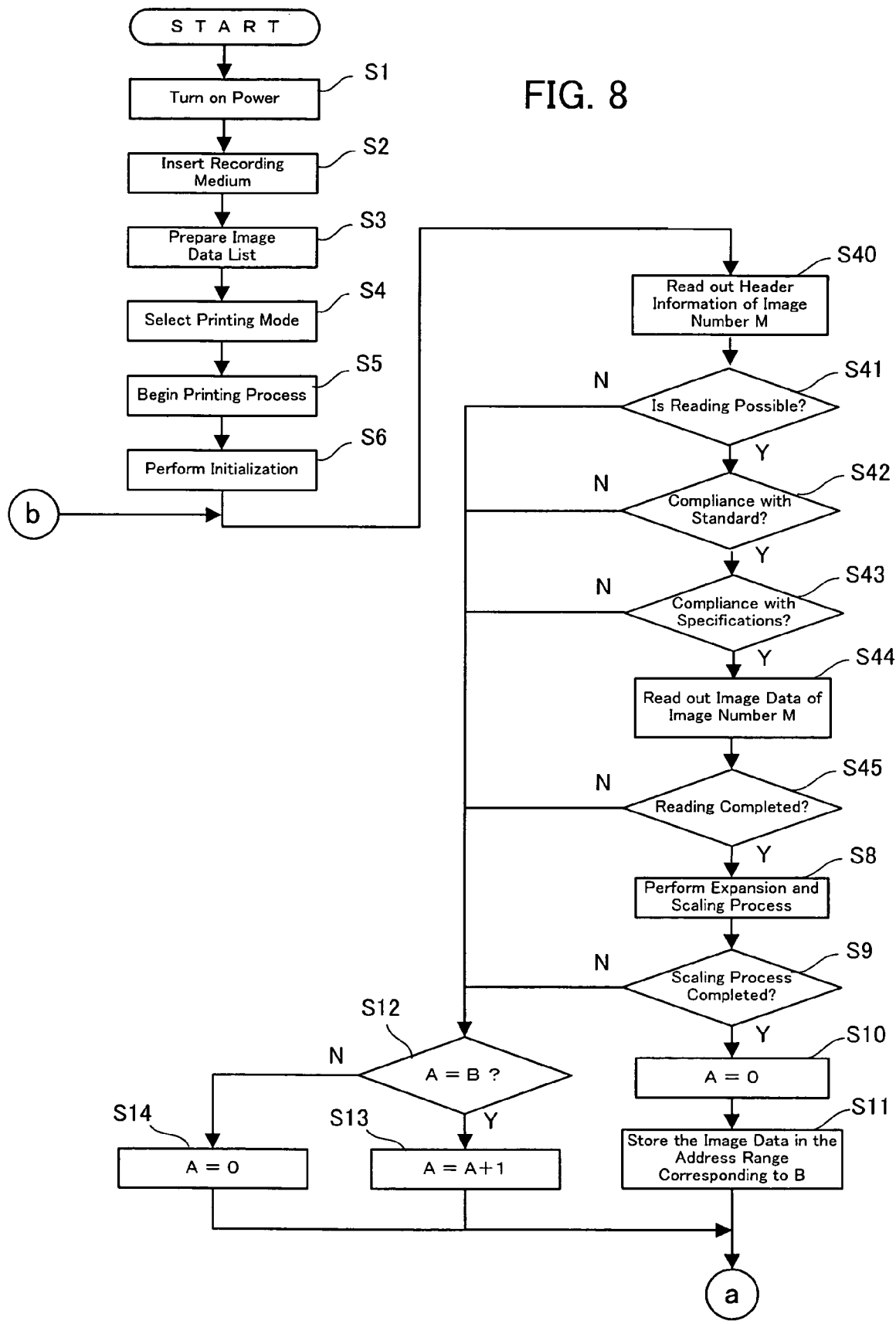
FIG. 8 is a flowchart showing the operation that the printer of a third embodiment of the present invention performs in index printing.

FIG. 8 is a flowchart showing the operation that the printer of the third embodiment of the present invention performs in index printing. FIG. 8 corresponds to the flowcharts shown in FIG. 4 or 7 and processes labeled with the same numerals are the same as described above, so that their further explanations have been omitted. It should be noted that, in the printer of the third embodiment, the variable A denotes the number of images with improper image data; in other words, the number of images with image data that cannot be printed on the printing paper by reducing the image or that is improper for printing on the printing paper by reducing the image.

After step S6, the necessary amount or all of the header information is read from the header attached to the image data of image number M (S40). Then it is determined whether the header information could be read from the header (S41). If it is determined in step S41 that the header information cannot physically be read, then step S12 is then performed. For example, if the header information cannot be read completely because of a scratch on the recording medium (1), step S12 is performed after step S41.

After step S41, if the header information could be read out successfully, then it is determined whether or not the read header information complies with the standard for image recording used by the printer (S42). If the header information does not comply with the standard for image recording, then step S12 is performed after step S42. For example, if the code of a given header information differs from the standard of the image data format (more specifically, if the code of the header differs from the standard of EXIF), then step S12 is performed after step S42.

If the header information complies with the standard for image recording, then, after step S42, it is determined whether or not the image data based on the read header information complies with the specification of the printer (S43). If it is determined in step S43 that the image data does not comply with the specification of the printer, then the steps from step S12 onward are performed. For example, the maximum number of pixels of the image data that can be printed by index printing by the printer may be 8 million pixels; if the number of pixels of the image data of image number M of given header information that has been read out is found to have 10 million pixels, then the steps from step S12 onward are performed after step S43, since the image according to this image data is improper for printing on the printing paper.

If it is determined in step S43 that the image data complies with the specification of the printer, then the image data of image number M is read (S44). Then it is determined whether or not the reading of the image data is completed (S45). For example, the reading of the image data may not be completed for similar reasons as in step S41. If it is determined in step S45 that the reading of the image data cannot be performed, then the steps from step S12 onward are performed after step S45.

If it is determined in step S45 that the reading of the image data is completed, then the steps from step S8 onward are performed (see FIG. 4 and the explanations thereof). If there is anything wrong with the image data such as that all or a part of the image data that has been read is zero, then the scaling process in step S8 is not performed properly and step S12 is performed after step S9, as described above.

In the printer of the third embodiment of the present invention, if the image data is determined to be improper by performing the processes shown in FIGS. 8 and 5, then index printing is performed by leaving the placement region of the images according to this image data empty. The determination whether the image data is improper or proper is performed in the steps S41, S42, S43, S45, and S9, as described above. Furthermore, if the image data of all of the plurality of images to be printed on one sheet of printing paper is determined to be improper, then the printer of the third embodiment does not print the printing paper.

The explanation of the above-mentioned embodiments is merely an illustration of the present invention, and is not meant to limit the invention as described in the claims, or to reduce the scope of the claims. In addition, the configuration of the various parts of the present invention is not limited to the above-described embodiments, and various modifications are, of course, possible within the technological scope described in the claims.

The invention claimed is:

1. An image forming apparatus comprising:
a scaling circuit subjecting image data of each of a plurality of images to a scaling process, the plurality of images being selected to be printed on one sheet of printing paper;
a microcomputer using the scaled image data of each of the images to prepare printing image data for printing the images on the printing paper; and
a print mechanism printing the images on the printing paper according to the printing image data,
wherein if the image data of the plurality of images includes image data that is improper for being subjected to the scaling process and printed on the printing paper, the microcomputer prepares the printing image data in such a manner that a region in which an image corresponding to the improper image data is to be printed is left blank and an image whose image data has been subjected to the scaling process is arranged at its corresponding region; and
wherein the print mechanism does not perform the process of printing on the printing paper if the total number of images whose image data is improper is equal to the maximum number of the images that can be printed on the printing paper.

2. The image forming apparatus according to claim 1, wherein the improper image data comprises at least corrupted image data.

3. The image forming apparatus according to claim 1, wherein the improper image data comprises at least image data on which a scaling process cannot be performed.

4. The image forming apparatus according to claim 1, wherein the improper image data comprises at least image data whose header information cannot be read out.

5. The image forming apparatus according to claim 1, wherein the improper image data comprises at least image data that does not comply with a standard for image recording used by the image forming apparatus.

6. The image forming apparatus according to claim 1, wherein the improper image data comprises at least image data that does not comply with specifications of the image forming apparatus.

7. The image forming apparatus according to claim 1, wherein each of the images is reduced by the scaling process.

8. The image forming apparatus according to claim 1, further comprising a recording medium for recording image data of the plurality of images.

9. The image forming apparatus according to claim 1, wherein the print mechanism prints a page number of the printing paper thereon.

10. A method of printing a plurality of images on one sheet of printing paper using an image forming apparatus, the plurality of images being selected to be printed on the printing paper, the method comprising:
determining whether or not image data of each of the plurality of images is improper for being subjected to a scaling process and printed on the printing paper;
subjecting proper image data of one or more of the plurality of images to the scaling process;
using the scaled proper image data to prepare printing image data for printing the one or more images on the printing paper in such a manner that a region in which an image corresponding to the improper image data is to be printed is left blank and an image whose image data is proper is arranged at its corresponding region; and
printing the one or more images on the printing paper according to the printing image data,
wherein the process of printing on the printing paper is not performed if the total number of images whose image data is improper is equal to the maximum number of the images that can be printed on the printing paper.

11. The method according to claim 10, wherein the improper image data comprises at least corrupted image data.

12. The method according to claim 10, wherein the improper image data comprises at least image data on which a scaling process cannot be performed.

13. The method according to claim 10, wherein the improper image data comprises at least image data whose header information cannot be read out.

14. The method according to claim 10, wherein the improper image data comprises at least image data that does not comply with a standard for image recording used by the image forming apparatus.

15. The method according to claim 10, wherein the improper image data comprises at least image data that does not comply with specifications of the image forming apparatus.

16. A method of printing a plurality of images, comprising:
a first step of assigning to each of the data sets of the plurality of images a number for specifying the respective image data set;
a second step of determining whether given image data is proper image data or improper image data;
a third step that, if the given image data is determined to be proper in the second step, appends the given image data to printing image data such that an image corresponding to that given image data is arranged, in an image corresponding to the printing image data, in a region that corresponds to a value of a stored first variable;
a fourth step of incrementing a value of a stored second variable if the given image data is determined to be improper in the second step;
a fifth step that, if the number assigned to the given image data is a final number, prints the images corresponding to the printing image data on one sheet of printing paper if the value of the second variable is determined to be different from a remainder that is obtained by dividing a total number of the plurality of images by a maximum number of image data sets that can be appended to the printing image data, and that does not print the images corresponding to the printing image data if the value of the second variable is determined to be equal to the remainder;

a sixth step that, if the number assigned to the image data is not the final number, determines whether or not the given image data is the image data that is appended last to the printing image data;

a seventh step that, if it is determined in the sixth step that the given image data is the image data that is appended last to the printing image data, prints the images corresponding to the printing image data on one sheet of printing paper if the value of the second variable differs from the maximum number, and that does not print the images corresponding to the printing image data if the value of the second variable is equal to the maximum number;

an eighth step that, if it is determined in the sixth step that the given image data is the image data that is appended last to the printing image data, or after the fifth or seventh step, determines whether or not the region that corresponds to the value of the first variable is the region in which the image corresponding to the image data that is appended last to the printing image data is arranged;

a ninth step that, if it is determined in the eighth step that the region that corresponds to the value of the first variable is not the region in which the image according to the image data that is appended last to the printing image data is arranged, increments the value of the first variable; and a tenth step that, if it is determined in the eighth step that the region that corresponds to the value of the first variable is the region in which the image according to the image data that is appended last to the printing image data is arranged, initializes the values of the first and the second variables;

wherein the steps from the second step onward are performed on the image data of the plurality of images, in an order of numbers assigned in the first step.

17. The method according to claim 10, wherein the one or more images are reduced by the scaling process.

18. The method according to claim 10, further comprising printing a page number of the printing paper on it.

* * * * *